April 20, 1943.  W. ERNST  2,316,944
VALVE
Filed Dec. 22, 1941  2 Sheets-Sheet 1
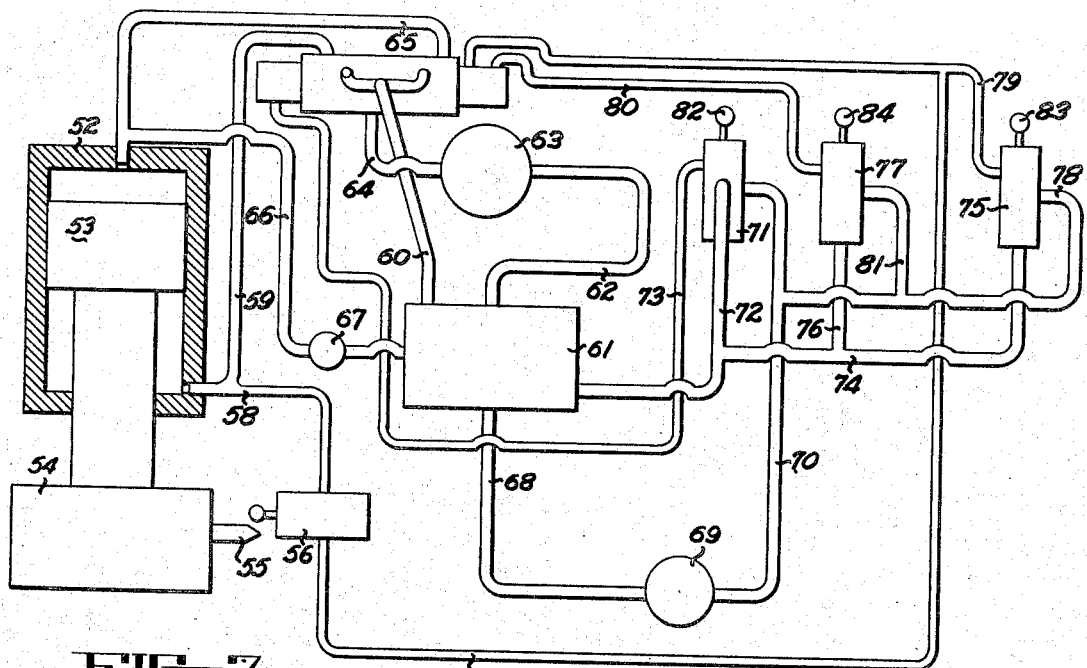
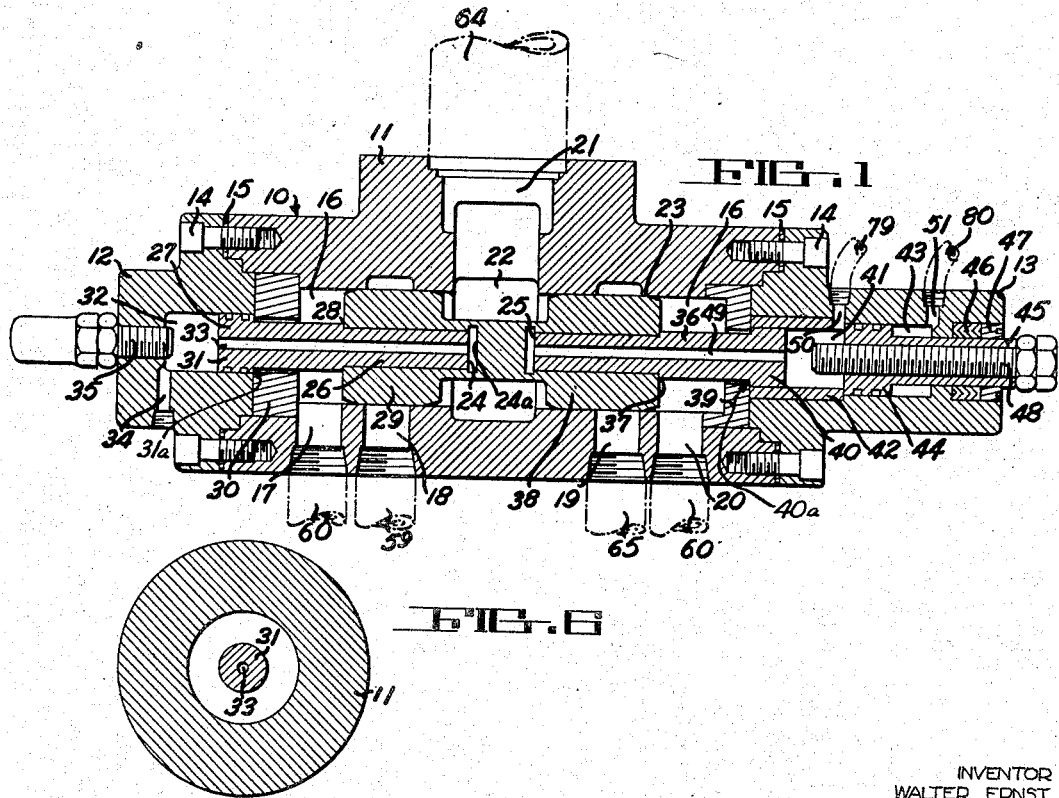
INVENTOR
WALTER ERNST
By
ATTORNEYS

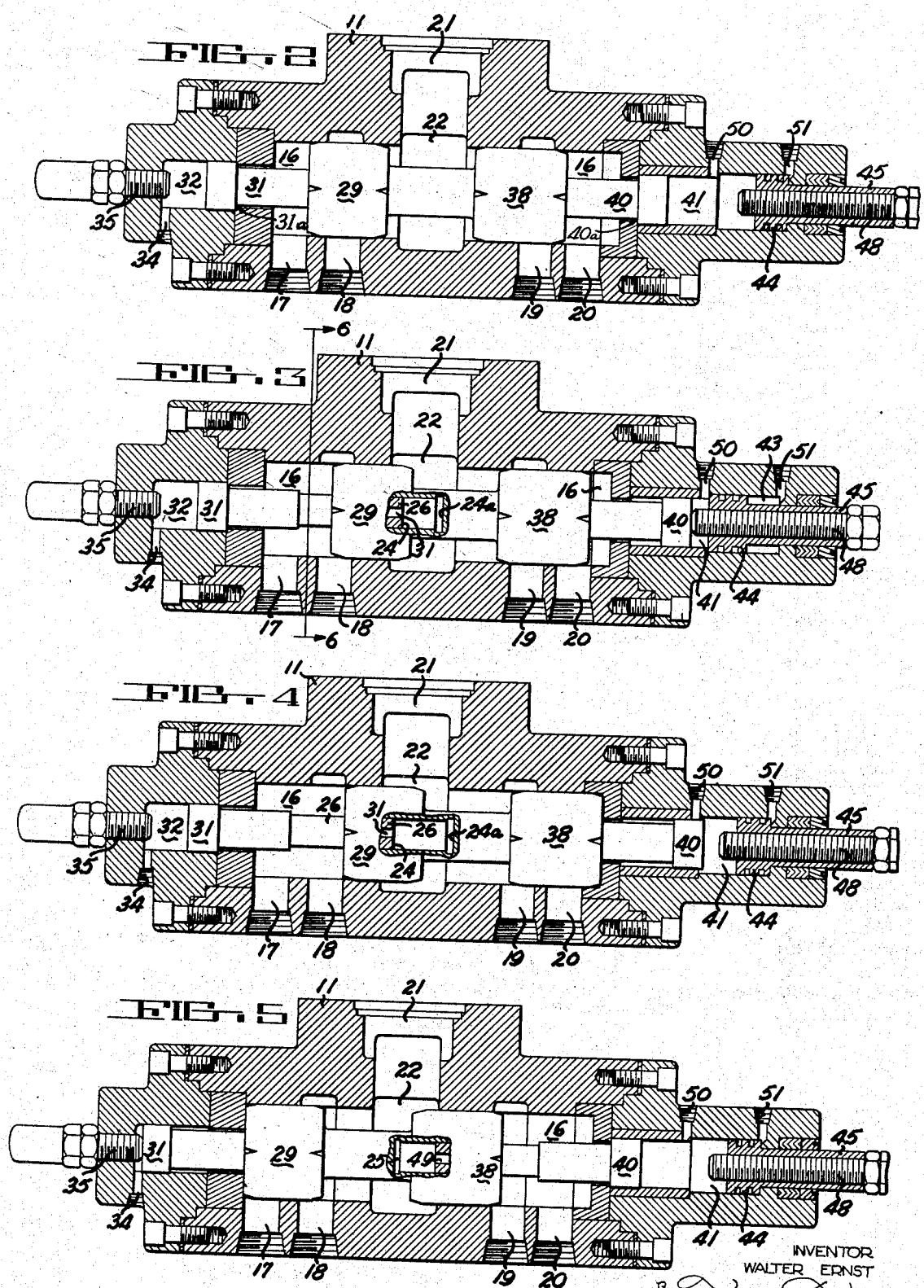

Patented Apr. 20, 1943

2,316,944

UNITED STATES PATENT OFFICE 2,316,944

VALVE

Walter Ernst, Mount Gilead, Ohio, assignor to The Hydraulic Development Corporation, Inc., Wilmington, Del., a corporation of Delaware Application December 22, 1941, Serial No. 423,972

16 Claims. (Cl. 137—144)

This invention relates to valves and, in particular, to valves for use in hydraulic systems.

It is an object of the invention to provide a new simplified control valve having fluid operable means associated therewith for controlling the position of the valve.

It is another object to provide a fluid operable four-way valve having two pairs of cooperating ports, which is operable selectively so as to establish fluid connection between the cooperating ports of each pair, or between the cooperating ports of one pair only.

It is a further object of the invention to provide a four-way valve, as set forth in the preceding paragraph, which is operable selectively so as to prevent any fluid connection between its ports.

Still another object of the invention consists in the provision of a valve having a reciprocable control valve member, in which a fluid operable plunger extending into a cylinder in the valve member controls the position of the valve member.

A still further object of the invention consists in the provision of a valve having a reciprocable valve member, which has provided therein two opposed cylinders with two fluid operable plungers reciprocably mounted in said cylinders for controlling the position of the valve member.

These and other objects and advantages of the invention will appear more clearly from the following specification in connection with the accompanying drawings, in which:

Figure 1 illustrates a section through the valve according to the present invention.

Figures 2, 3, 4 and 5 show partially in section the valve according to the invention in four different positions.

Figure 6 is a section along the line 6—6 of Figure 3, and

Figure 7 illustrates a hydraulic press circuit in connection with which the valve according to the invention may be used.

Structural arrangement

The valve shown in the drawings comprises a casing, generally designated 10, which is composed of a central member 11 and two end members 12 and 13. The end members 12 and 13 are connected with the central member 11 in any convenient manner, for instance, by means of screws 14, in which instance gaskets 15 are interposed between the end members and the central member.

The central member 11 is provided with a bore 16 communicating with ports 17, 18, 19 and 20. The bore 16 is furthermore connected with a main port 21 through an annular channel 22. Reciprocably mounted in the bore 16 is a valve member 23 having at each end thereof a cylinder 24 and 25 therein of substantially equal section. Reciprocably mounted in the cylinder 24 is the portion 26 of a stepped plunger, generally designated 27. The plunger 27 has a shoulder 28 for engagement with the piston portion 29 of the valve member 23.

The plunger 27 extends through the ring member 30 interposed between the central member 11 and the end member 12, and has a piston portion 31 reciprocably mounted in the cylinder 32 of the end member 12 and adapted with its shoulder 31a to abut the ring member 30. The plunger 27 has a bore 33 extending through the entire length thereof.

Communicating with one end of the cylinder 32 is a port 34 for admitting fluid into or discharging fluid from the cylinder 32. Extending into the cylinder 32 is an adjustable abutment member, for instance a screw 35, adapted to limit the leftward movement of the plunger 27.

Similar to the cylinder 24, the cylinder 25 has reciprocably mounted therein a stepped plunger 36 with a shoulder 37 for abutment with the piston portion 38 of the valve member 23. The plunger 36 extends through a ring member 39 interposed between the central member 11 and the end member 13, and has a piston portion 40 reciprocably mounted in a cylinder 41, formed by a sleeve 42 in the end member 13. The inward movement of the piston portion 40 is limited by the abutment of the shoulder 40a of piston portion 40 with the ring member 39.

The end member 13 comprises furthermore a cylinder 43 of larger section than the cylinder 41. Reciprocable in the cylinder 43 is a piston 44 with a piston rod 45 extending through the end member 13. To prevent leakage between the piston rod 45 and the end member 13, packing material 46 compressed by a gland 47 is provided at the outer end of the end member 13.

The piston 44 and piston rod 45 have a threaded bore therethrough engaged by an adjusting screw 48 for limiting the outward movement of the plunger 36. The plunger 36 has, similar to the plunger 27, a longitudinal bore 49 therethrough. Communicating with the cylinder 41 is a port 50, while a port 51 communicates with the cylinder 43.

The valve, according to the invention, may be used in connection with various hydraulic circuits, for instance, with the press circuit shown in Figure 7. This press circuit comprises a press cylinder 52 having reciprocably mounted therein a ram 53 connected with a press platen 54.

The press platen 54 carries an actuating arm 55 which, in the fully retracted position of the ram 53, i. e., in this instance its uppermost position, actuates the two-way valve 56 so that it interrupts fluid connection between the conduit 57 and the conduit 58, which latter leads to the lower portion of the press cylinder 52. The valve 56, when released by the arm 55, automatically establishes fluid connection between the conduits 57 and 58.

Branching off from the conduit 58 is a conduit 59 which leads to the port 18 of the valve casing 10. The ports 17 and 20 in the valve casing 10 are connected with a conduit 60 leading to a fluid reservoir or surge tank 61. Connected with the surge tank 61 is a conduit 62 which leads to a fluid source 63, for instance, an accumulator, which communicates through conduit 64 with the main or inlet port 21. A conduit 65 furthermore establishes fluid connection between the upper portion of the press cylinder 52 and the port 19.

Branching off from the conduit 65 is a conduit 66 comprising a make-up device 67, for instance a surge valve, leading to the tank 61. Also connected with the tank 61 is a conduit 68 leading to the suction side of a pilot pump 69, the pressure side of which communicates through conduit 70 with one port of a three-way valve 71. Another port of the three-way valve 71 is connected by means of conduit 72 with the tank 61. A third conduit 73 connects the third port of valve 71 with the port 34 in the end member 12 of the valve casing 10.

Branching off from the conduit 72 is a conduit 74 leading to one port of a three-way valve 75 and communicating through a branch line 76 with one port of a three-way valve 77. The valve 75 has one port connected with the conduit 70 through conduit 78, while another port of the valve 75 communicates through the conduit 79 with the port 50 in the end member 13 of the valve casing 10. The conduit 79 also communicates with the conduit 57. The other port 51 in the end member 13 is connected by means of conduit 80 with one port of the three-way valve 77.

Branching off from the conduit 78 is a conduit 81 leading to the three-way valve 77. The three-way valves 71, 75 and 77 may be operated in any desired manner, for instance, merely by actuating the respective valve members 82, 83 and 84. The said three-way valves may be of any standard type and are so arranged that in one position the pressure line 70 communicates with the respective pilot lines 73, 79 and 80, while in the other position of the valves, the conduit 70 is connected with the exhaust line 74.

*Operation*

The operation of the valve according to the present invention will best appear when described in connection with the operation of the press circuit shown in Figure 7.

Assuming that the ram 53 is in its uppermost position, in which the platen arm 55 causes the valve 56 to interrupt fluid connection between the conduits 57 and 58, and that it is now desired to start a pressing cycle, the operator conditions the fluid sources 63 and 69 for delivery and shifts the valve member 83 so as to establish fluid connection between the conduits 79 and 74, while interrupting fluid connection between the conduits 79 and 78. Consequently, the cylinder 41 and also the cylinder 25 communicating with the latter through bore 49 is connected through conduits 79 and 74 with the fluid tank 61.

Since, on the other hand, the valve members 82 and 84, in the position shown in the drawings, establish fluid connection between the conduits 70, 73 and 80, pilot fluid pressure is conveyed from conduits 70 and 73 into the cylinders 32 and 24, while simultaneously fluid pressure is conveyed from the pilot pump 69 through conduits 70, 81 and 80 into the right hand portion of the cylinder 43. Therefore since, as previously mentioned, no pressure prevails in cylinder 41, the piston 44 is moved from its Figure 2 position into its Figure 3 position, while the valve member 23 is moved from its Figure 2 position toward the right until the piston portion 40 abuts the abutment screw 48, whereupon the valve member 23 comes to a halt. The elements in the valve casing 10 then occupy the position shown in Figure 3. In this position, fluid connection is established between the conduits 59 and 60 so that fluid from the lower portion of the press cylinder 52 may escape through the said conduits 59 and 60 into the tank 61. As a result thereof, the ram 53 starts to move downwardly by gravity.

As will be clear from the above, the adjustment of the abutment screw 48 with regard to the piston portion 44 determines the extent to which the opening 18 is released by piston portion 29 and, consequently, the size of the opening through which the fluid escapes from conduit 59 to conduit 60. In other words, the adjustment of screw 48, with regard to piston portion 44, determines the speed at which the ram 53 is permitted to slide downwardly by gravity.

The suction created in the upper portion of the press cylinder 52 during the downward movement of the ram 53 by gravity causes fluid to flow from the tank 61 through the make-up device 67 into the upper portion of the press cylinder 52. As soon as the platen arm 55 releases the valve 56, the latter establishes fluid connection between the conduits 58 and 57. This, however, does not cause any change in the operation, since the conduit 79 is at this time connected to the tank 61, as previously mentioned.

When the press platen 54 engages the work piece, pressure begins to build up in the upper portion of the press cylinder 52, which pressure closes the make-up device 67 so as to interrupt fluid connection between the tank 61 and the conduit 66. The operator now shifts the valve member 84 so as to interrupt fluid connection between the conduit 80 and the conduit 81, which latter is connected to the pressure line 70, while fluid connection is established between the conduits 80 and 76, which latter communicates with the tank 61.

Consequently, the cylinder 43 is now connected to the tank 61 so that the pressure acting in cylinders 32 and 24 shifts the valve member 23 further toward the right from Figure 3 into Figure 4 position, until either the piston portion 38 abuts the ring member 39, or the piston portion 40 of the plunger 36 abuts the abutment screw 48. The elements in the valve casing 10 then occupy the position shown in Figure 4. In this position, fluid connection is established between the pressure line 64 and the conduit 65 so that fluid pressure from the fluid source 63 is conveyed through conduits 64 and 65 into the upper portion of the press cylinder 52, where it acts upon the ram 53 and causes the latter to perform its pressing stroke.

When the pressing stroke is completed, and the operator desires to return the ram to its retracted position, he shifts the valve member 82 so as to interrupt fluid connection between the conduits 70 and 73, while establishing fluid connection between the conduits 73 and 72.

Consequently, the cylinders 32 and 24 are now connected with the tank 61. The operator furthermore returns the valve members 83 and 84 into their position shown in Figure 7, in which they establish fluid connection between the conduits 80, 81, 79, 78 and 70, so that fluid pressure prevails in cylinder 43 and also in cylinders 41 and 25.

Inasmuch as the piston surface of piston 44 toward the right is smaller than the piston area of piston 44 adjacent the piston 41, no movement of the piston 44 toward the left occurs. Since, on the other hand, as previously mentioned, the cylinders 24 and 32 are connected with the tank 61, the fluid pressure prevailing in cylinders 41 and 25 causes the valve member 23 to move toward the left until either the piston portion 29 of the valve member 23 engages the ring member 30, or the piston portion 31 of plunger 27 abuts the abutment screw 35. The elements in the valve casing 10 then occupy the position shown in Figure 5. In this position, fluid connection is established between the main port 21 and the port 59, while, on the other hand, the ports 19 and 20 are in fluid communication with each other. Therefore, pressure fluid is now conveyed from the fluid source 63 through the conduits 64 and 59 into the lower portion of the press cylinder 52, while fluid escapes from the upper portion of press cylinder 52 through the conduits 65 and 60 into the tank 61. The press ram 53, therefore, moves upwardly.

When the press ram 53 has reached its uppermost or retracted position, the operator shifts the valve member 82 into its position shown in Figure 7, so that fluid connection is again established between conduits 70 and 73, while fluid connection is interrupted between the conduits 73 and 72. Pilot pressure fluid is, therefore, conveyed from the pilot pump 69 through conduits 70 and 73 into the cylinder 32 and through bore 33 into the cylinder 24. The combined fluid pressure prevailing in the cylinders 32 and 24 overcomes the fluid pressure in the cylinder 25 and moves the valve member 23 toward the right until the shoulder 31a of piston portion 31 engages the shoulder of the ring member 30, whereupon the valve member 23 comes to a halt provided that the bottom area 24a of the cylinder 24 is not greater than the bottom area of cylinder 25. However, if, due to improper machining, the area 24a should be slightly larger than the bottom area in cylinder 25, the valve member 23 would be stopped by abutment of piston portion 38 with the shoulder 37. It will be noted that the right hand area of piston portion 40 is larger than the area 24a so that the valve member 23 is properly returned to its outer or closing position.

The elements in the valve casing 10 then occupy the position shown in Figure 2, in which fluid connection is interrupted between the main port 21 and the ports 18 and 19, while fluid connection is likewise interrupted between the ports 17 and 20 with either of the ports 18 and 19. Consequently, since fluid is neither admitted to nor withdrawn from the press cylinder 52, the ram 53 comes to a halt.

In this retracted position, the arm 55 engages the valve 56 so as to cause the latter to interrupt fluid connection between the conduits 57 and 58. However, if, due to leakage, the ram 53 should drop somewhat, the arm 55 immediately releases the valve 56 so that the latter establishes fluid connection between the conduits 57 and 58. Since, as has been mentioned above, at this time fluid pressure prevails in conduit 79, which now communicates with the pressure line 70 of the pilot pump 69, this pressure is immediately conveyed to conduit 57 and from there into the lower portion of the press cylinder 52 so as to return the ram 53 to its retracted position.

When this position has been reached, the arm 55 again actuates the valve 56 so as to cause the latter to interrupt fluid connection between the conduits 57 and 58. As will be noted, the automatic return of the ram 53 to its retracted position, in case the ram 53 should drop, due to leakage, is effected without actuation of the elements in the valve casing 10.

It will be understood that I desire to comprehend within my invention such modifications as come within the scope of the claims and the invention.

Having thus fully described my invention, what I claim as new and desire to secure by Letters Patent, is:

1. In combination in a valve, a casing having a longitudinal bore therein with an inlet port, an outlet port and two service ports, a valve member reciprocable in said bore for controlling said ports, and fluid operable means operable to shift said valve member so as to cause the latter selectively to connect one of said service ports with said inlet port, while simultaneously connecting the other service port with said outlet port, or to effect fluid connection between said outlet port and one of said service ports, while simultaneously preventing fluid connection between said other service port and said inlet port.

2. In combination in a valve, a casing having a main cylinder, a first auxiliary cylinder adjacent one end of said main cylinder and a second auxiliary cylinder adjacent the other end of said main cylinder, said main cylinder being provided with two service ports, an inlet port and two interconnected outlet ports, a valve member reciprocably mounted in said main cylinder for controlling the fluid connection between said ports, and fluid operable plunger means reciprocable in said first and second auxiliary cylinders and provided with means to convey pressure fluid therethrough to said valve member for controlling the position thereof.

3. In combination in a valve, a casing having a main cylinder, a first auxiliary cylinder adjacent one end of said main cylinder and a second auxiliary cylinder adjacent the other end of said main cylinder, said main cylinder being provided with two service ports, an inlet port and two interconnected outlet ports, a valve member reciprocably mounted in said main cylinder for controlling the fluid connection between said ports, two opposed plungers reciprocably mounted in said first and second auxiliary cylinders respectively and having a bore therethrough for establishing fluid connection between the respective auxiliary cylinder and an area on said valve member for exerting fluid pressure thereupon, and means for selectively admitting fluid pressure to or withdrawing fluid pressure from said auxiliary cylinders.

4. In combination in a valve, a casing having a main cylinder, a first auxiliary cylinder adjacent one end of said main cylinder and a second auxiliary cylinder adjacent the other end of said main cylinder, said main cylinder being provided with two service ports, an inlet port and an outlet port, a valve member reciprocably mounted in said main cylinder for controlling the fluid connection between said ports, said valve member being provided with two opposed but separate control cylinders, a first hollow control plunger having a portion of larger section reciprocable in said first auxiliary cylinder and a portion of smaller section reciprocable in the adjacent control cylinder, a second hollow control plunger having a portion of smaller section reciprocable in the other control cylinder and a portion of larger section reciprocable in said second auxiliary cylinder, and means for selectively admitting fluid to or withdrawing fluid from said auxiliary cylinders.

5. In combination in a valve, a casing having a bore therein with an inlet port, an outlet port and two service ports, a valve member reciprocable in said bore for controlling said ports, fluid operable shifting means operable to shift said valve member so as selectively to connect one of said service ports with said inlet port, while simultaneously connecting the other service port with said outlet port, or to effect restricted fluid connection between said outlet port and one of said service ports, while simultaneously preventing fluid connection between said other service port and said inlet port, and fluid operable abutment means for limiting movement of said valve member in one direction.

6. In combination in a valve, a casing having a main cylinder, a first auxiliary cylinder adjacent one end of said main cylinder and a second auxiliary cylinder adjacent the other end of said main cylinder, said main cylinder being provided with two service ports, an inlet port and two interconnected outlet ports, a valve member reciprocably mounted in said main cylinder for controlling the fluid connection between said ports, said valve member being provided with two opposed but separate control cylinders, a first hollow control plunger having a portion of larger section reciprocable in said first auxiliary cylinder and a portion of smaller section reciprocable in the adjacent control cylinder, a second hollow control plunger having a portion of smaller section reciprocable in the other control cylinder and a portion of larger section reciprocable in said second auxiliary cylinder, a plurality of adjustable abutment members adjacent said first and second plungers for limiting the strokes thereof in one direction, and fluid operable means for shifting one of said abutment members selectively into one of two positions.

7. In combination in a valve, a casing having a main cylinder, a first auxiliary cylinder adjacent one end of said main cylinder and a second auxiliary and a third auxiliary cylinder adjacent the other end of said main cylinder, said main cylinder being provided with two service ports, an inlet port and two interconnected outlet ports, a valve member reciprocably mounted in said main cylinder for controlling the fluid connection between said ports, said valve member being provided with two opposed but separate control cylinders, a first hollow fluid operable plunger having a portion of larger section reciprocable in said first auxiliary cylinder and a portion of smaller section reciprocable in the adjacent control cylinder, a second hollow fluid operable control plunger having a portion of smaller section reciprocable in the other control cylinder and a portion of larger section reciprocable in said second auxiliary cylinder, a plurality of abutment members adjacent said first and second plungers for limiting the strokes thereof in one direction, a double-acting fluid operable plunger in said third auxiliary cylinder for varying the position of one of said abutment members, and means for admitting fluid to or withdrawing fluid from said auxiliary cylinders to cause the respective auxiliary plungers to vary the position of said valve member.

8. In combination in a valve, a casing having a bore therein with an inlet port, an outlet port and two service ports, a valve member reciprocable in said bore for controlling said ports, fluid operable abutment members adjacent each end of said valve member for shifting the same into predetermined positions, and means associated with said abutment members for admitting pressure fluid through said abutment members to said valve member for exerting shifting pressure thereupon.

9. In combination in a valve, a casing having a longitudinal bore therein with an inlet port, two service ports and two interconnected outlet ports, a valve member reciprocable in said bore for controlling said ports, fluid operable means operable to shift said valve member so as selectively to connect one of said service ports with said inlet port, while simultaneously connecting the other service port with one of said outlet ports, or to effect connection between one of said outlet ports and one of said service ports, while simultaneously preventing fluid connection between the other service port and said inlet port, and a plurality of adjustable abutment means adjacent said fluid operable means for varying the maximum stroke of said fluid operable means, one of said abutment means being carried by a fluid operable piston.

10. In combination in a valve, a casing having a bore therein with an inlet port, an outlet port and two service ports, a valve member reciprocable in said bore for controlling said ports, two opposed control cylinders respectively arranged adjacent each end of said valve member and forming an integral unit therewith, fluid operable plungers having a bore therethrough and being reciprocably arranged in said control cylinders, and means for selectively admitting pressure fluid to said plungers and said control cylinders, or to withdraw fluid therefrom for controlling the position of said valve member.

11. In combination in a valve, a valve casing having a central portion with a main bore and two end portions each having an auxiliary cylinder therein, one of said end portions also being provided with a control cylinder, said main bore having two service ports, an inlet port and an outlet port, a plurality of plungers respectively reciprocable in said auxiliary cylinders and adapted to engage said valve member for causing shifting movement thereof, each of said plungers having a bore therethrough for establishing fluid connection between the respective auxiliary cylinder and a predetermined area of said valve member, a double-acting control piston having abutment means associated therewith and being fluid operable to limit the movement of one of said plungers in one direction, and means for selectively admitting fluid pressure to or releasing fluid pressure from said auxiliary cylinders and their adjacent predetermined areas on said valve member.

12. In combination in a valve, a casing having a main cylinder, a first auxiliary cylinder adjacent one end of said main cylinder and a second and third auxiliary cylinder adjacent the other end of said main cylinder, said main cylinder being provided with two service ports, an inlet port and two interconnected outlet ports, a valve member reciprocably mounted in said main cylinder for controlling the fluid connection between said ports, said valve member being provided with two opposed but separate control cylinders, a first hollow control plunger having a portion of larger section reciprocable in said first auxiliary cylinder and a portion of smaller section reciprocable in said adjacent control cylinder, a second hollow control plunger having a portion of smaller section reciprocable in the other control cylinder and a portion of larger section reciprocable in said second auxiliary cylinder, a plurality of abutment members adjacent said first and second control plungers for respectively limiting the strokes thereof in one direction, one of said abutment members being reciprocably mounted in said third auxiliary cylinder in response to fluid pressure acting thereupon, and a plurality of pilot ports for admitting fluid pressure to or releasing fluid pressure from said auxiliary cylinders to cause said auxiliary plungers to shift said valve member into a desired controlling position.

13. In combination in a valve, a casing having a main cylinder and an auxiliary cylinder, said main cylinder being provided with two service ports, an inlet port and an outlet port, a valve member reciprocably mounted in said main cylinder for controlling the fluid connection between said ports, fluid operable means associated with said valve member for selectively shifting the same into position for full fluid connection between said outlet port and one of said service ports, or into position for restricted fluid connection between said outlet port and said last mentioned service port, and means associated with said auxiliary cylinder for varying said restricted fluid connection.

14. In combination in a valve, a casing having a main cylinder and two auxiliary cylinders adjacent each end thereof, said main cylinder being provided with an inlet and an outlet port and with two service ports, a valve member reciprocably mounted in said main cylinder for controlling said ports, said valve member being provided with two opposed areas of substantially the same size, two auxiliary plungers respectively reciprocable in said auxiliary cylinders for effecting a shifting movement of said valve member, each of said auxiliary plungers being provided with a passageway for conveying pressure fluid from the respective auxiliary cylinder to the adjacent one of said opposed areas and also having a fluid operable piston portion for moving the respective auxiliary plunger, and means for limiting the movement of said auxiliary plungers toward said main cylinder, the effective area of the piston portion of each auxiliary plunger being larger than the effective area of each of said opposed areas.

15. In combination in a valve, a casing having a main cylinder and two auxiliary cylinders adjacent each end thereof, said main cylinder being provided with an inlet and an outlet port and with two service ports, a valve member reciprocably mounted in said main cylinder for controlling said ports, said valve member being provided with two opposed cylinders having a cylinder bottom of substantially the same area, two auxiliary plungers adapted to move said valve member and having a piston portion respectively reciprocable in said auxiliary cylinders and also having an extension respectively reciprocable in said opposed cylinders, each of said auxiliary plungers having a passageway associated therewith for conveying fluid pressure from the respective auxiliary cylinder to the adjacent one of said opposed cylinder, and means for limiting the movement of said auxiliary plungers, the effective area of the piston portion of each of said auxiliary plungers being larger than each of said cylinder bottoms of said opposed cylinders.

16. In combination in a valve, a casing having a longitudinal bore therein with an inlet port, an outlet port and service ports, a valve member reciprocable in said bore for controlling said ports, and fluid operable means operable to shift said valve member so as to cause the latter selectively to effect a restricted fluid connection between one of said service ports and said outlet port, while simultaneously preventing fluid connection between said inlet port and the other service port, or to effect unrestricted fluid connection between said outlet port and one service port, and also between the other service port and said inlet port.

WALTER ERNST.